United States Patent [19]

Schöneweiss

[11] Patent Number: 4,476,971

[45] Date of Patent: Oct. 16, 1984

[54] SAFETY DEVICE FOR CONVEYANCE SYSTEMS FOR PEOPLE

[75] Inventor: Klaus Schöneweiss, Hattingen, Fed. Rep. of Germany

[73] Assignee: O&K Orenstein & Koppel Aktiengesellschaft, Berlin, Fed. Rep. of Germany

[21] Appl. No.: 44,422

[22] Filed: Jun. 1, 1979

[30] Foreign Application Priority Data

Jun. 3, 1978 [DE] Fed. Rep. of Germany ....... 2824452

[51] Int. Cl.³ ............................................ B65G 43/00

[52] U.S. Cl. .................................... 198/323; 198/325

[58] Field of Search ....................... 198/323, 325, 856; 104/25

[56] References Cited

U.S. PATENT DOCUMENTS 2,030,103 2/1936 Dunlop .............................. 198/323

FOREIGN PATENT DOCUMENTS 2108025 5/1972 France ................................ 198/323

1159589 7/1969 United Kingdom ................ 198/323

*Primary Examiner*—Joseph E. Valenza

*Attorney, Agent, or Firm*—Martin A. Farber

[57] ABSTRACT

A safety device for passenger transporter systems for the prevention of the wedging in of foreign bodies, with a switching element, the latter serving to stop the transporter system, the switching element to be actuated from within the stationary part of the intake by means of horizontally moveable comb segments and/or a rotatably arranged carrier plate, the switching element comprises a switch which is operatively actuated via an angle lever, the latter being moved by means of a switch rod. One of the legs of the angle lever is connected with a push rod which can actuate the switch, the push rod being biased by means of a compression spring. The passenger transporter system upon displacement of at least one comb segment and/or upon lifting of the carrier plate as a consequence of pivoting about a pivot point is stopped by actuation of the switch by means of pivoting of the angle lever.

25 Claims, 3 Drawing Figures

SAFETY DEVICE FOR CONVEYANCE SYSTEMS FOR PEOPLE

Figure 1:
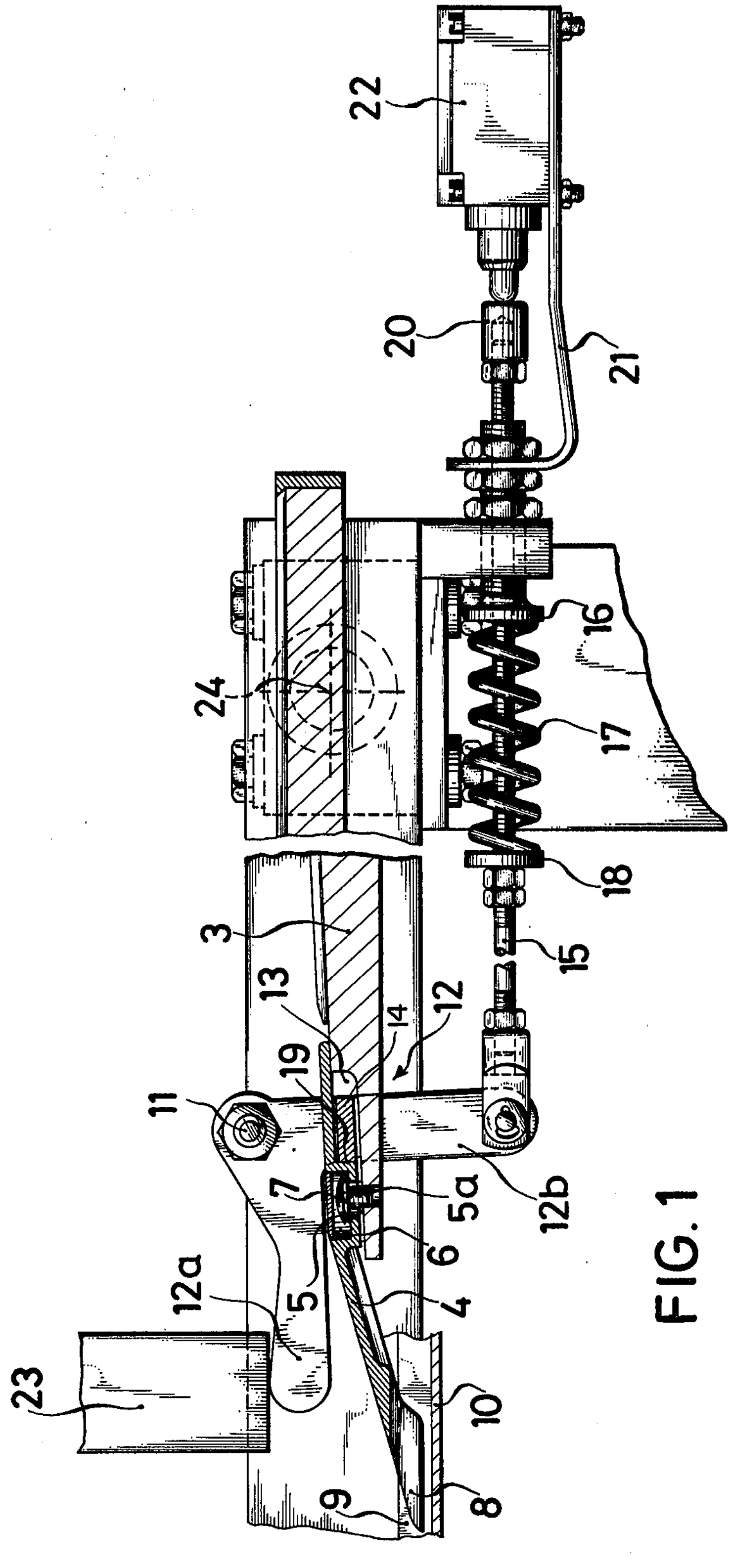

The invention relates to a safety device for passenger transporter systems for the prevention of the wedging in of foreign bodies, with a switching element, the latter serving to stop the transporter system, the switching element to be actuated from within the stationary part of the intake by means of horizontally moveable comb segments and/or a rotatably arranged carrier plate.

In one known arrangement the escalator is stopped when a foreign body is jammed between the stepping plates and the comb segments as a result of the comb segments (which are individually displaceable on the stepping plate) pressing upon a rubber or flexible tube and thereby producing a pressure wave which stops the escalator by means of a pressure wave switch. This has the disadvantage that in case of a defective rubber flexible tube no switching-off takes place, since no pressure wave arises, even though the comb segment has been displaced. In addition in this known arrangement the actuation of the switch which serves for the stopping is not necessary and thus does not correspond to the safety specifications.

Another known safety circuit is equipped with comb segments which are individually displaceable on the carrier plate, which comb segments are connected with each other on their side surfaces by electrical contact elements. A susceptability to trouble or failure is provided in that several open contact bridges are provided which e.g., can oxidize and thereby cause breakdowns or stoppages.

In a further known arragement the front comb plate with the segments arranged fixedly on it is mounted moveably about a pivot point against spring pressure. With a horizontal displacement as a consequence of jamming of a foreign body the entire comb carrier must be moved so that the safety device no longer responds very sensitively. In addition a safety contact is necessary on each side.

The invention is based on the task of making a device for safe or certain stopping of a passenger transport or conveyor installation whereby the device responds to horizontal as well as vertical displacement of even an individual or single comb element by the jammed or wedged in object and causes the instantaneous stopping by means of only one switch.

This task is solved in accordance with the invention in the manner that the switching element comprising a switch is actuated by an angle lever, the latter being moved by means of a switch rod (14), one of the legs (126) of the angle lever being connected with a push rod (15), the push rod being acted upon by means of a compression spring (17), such that the passenger transporter system upon displacement of one comb segment (4) or several comb segments and/or upon lifting of the carrier plate (3) as a consequence of swinging about a pivot point (24) is stopped by actuation of the switch (22).

Figure 2:
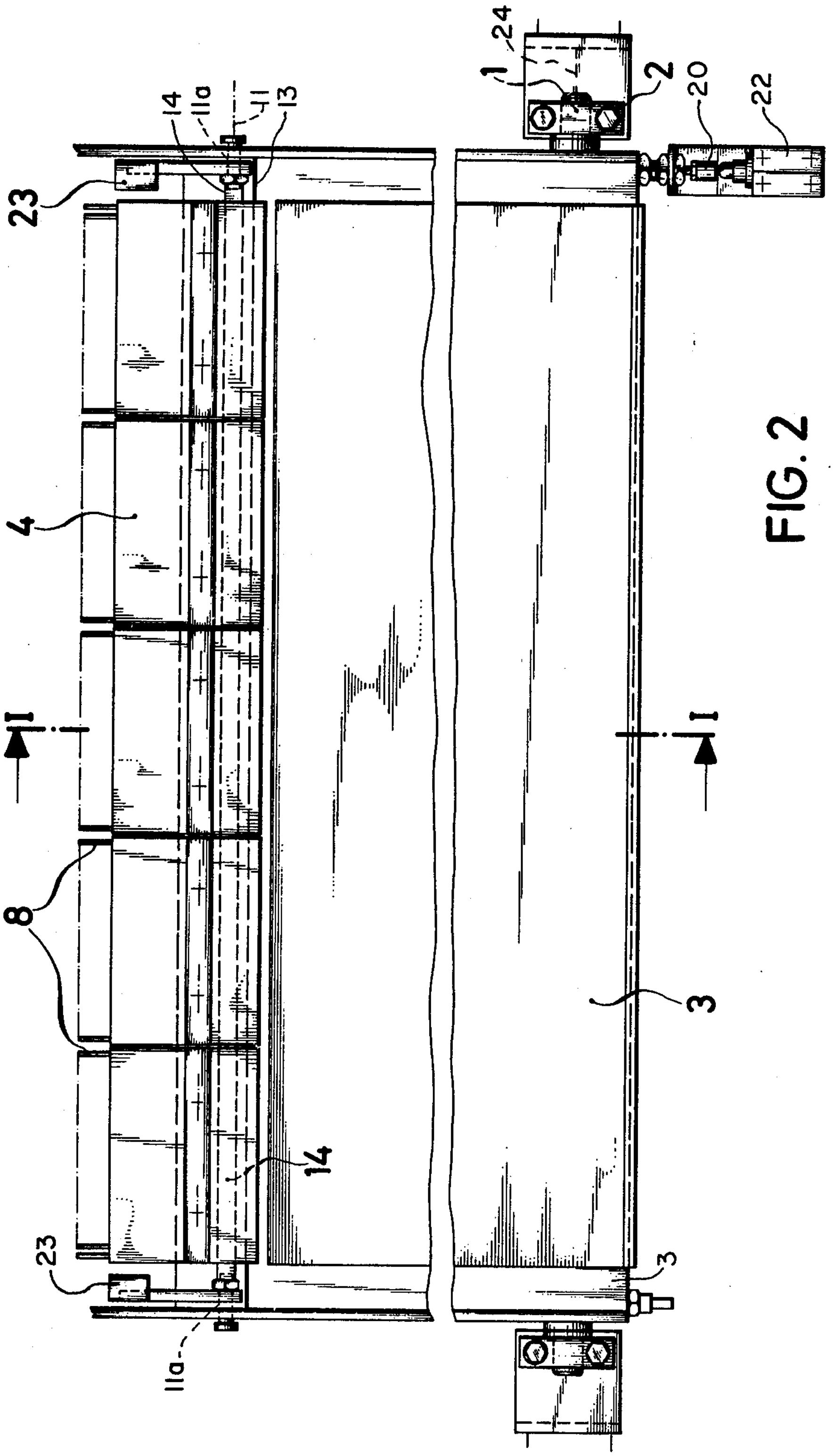
Figure 3:
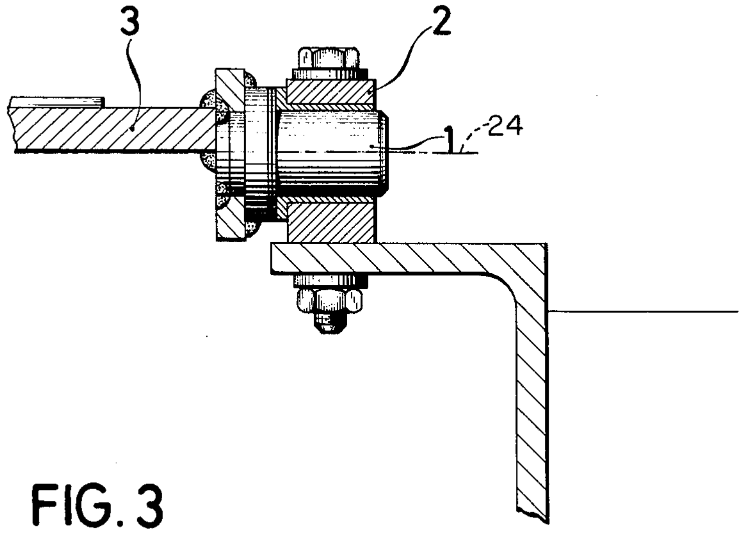

One embodiment example of the invention is illustrated in the drawing and is described in the following. It shows FIG. 1 shows a cross section according to the lines A—A of FIG. 2 through a comb segment which is arranged on the moveable carrier plate at the intake or inlet, a view of the actuating device with the switch and a view of the angle lever arrangement with the rigid abutment stops, FIG. 2 shows a top plan view of the arrangment according to FIG. 1, FIG. 3 shows a cross section through the carrier plate bearing.

Comb segments 4 are fastened, movably in the longitudinal direction of the steps, on the carrier plate 3, the latter being pivotally mounted about pivot point 24 in stationary bearings 2, by means of bearing pins 1, on the fixed part of a passenger transporter system, the comb segments 4 being arranged comb-like adjacent to one another across the width of the stepping surface, e.g. of an escalator. This occurs by means of lens head screws or fillister head screws 5, which are let into recesses 6 of the comb segments 4. The contact pressure which causes the support of the comb segment 4 on the carrier plate 3 is produced by spring washers or cup springs 7 which are arranged between the head of the lens head screw 5*a* and the recess 6. In addition a teflon foil or foiling is disposed between the comb segment 4 and the carrier plate 3 in order to achieve a constant coefficient of friction independent of the contact pressure. Comb-like teeth or prongs 8 are present at the end of the comb segment 4, which end projects beyond the carrier plate 3, the prongs 8 meshing with the channels 9 of the stepping plates 10. Bearings 11*a* are mounted at both sides of the movable comb segments, in which bearings the angle levers 12 are mounted for pivoting about the pivot point 11; the angle levers carry a switching rod 14 on their ends which project into the recess 13 of the carrier plate 3, which switch rod 14 extends across the entire width of the steps. Push rods 15 are disposed on the angle levers 12, the push rods 15 being mounted in adjustable or shiftable bearing bushings 16 and by means of the compression spring 17 and the adjustable spring plate or collar 18 causes a continuous or constant abutment of the switch rod 14 against the shoulder or set-off 19 of the comb segments 4. A ram knob 20 is seated on the end of the push rod 15, the ram knob actuating the switch 22, which switch 22 is secured on the holder or support 21. Upon pivotally lifting the carrier plate 3 about pivot point 24, the legs 12*a* then come to lie against the fixed abutments 23 since the angle lever bearings 11*a* with the angle levers 12 are likewise lifted with the carrier plate 3, and the push rod 15 is actuated in the same manner as before by the leg 12*b* pivoting toward the switch 22.

The manner of operation is as follows:

If an object is jammed in the channels of the stepping or running plates 10, which object bumps or pushes against the points or prongs 8 upon the running in of the stepping plates 10 of the step or (in case of autowalks) pallet, the opposite comb segment 4 is displaced, which comb segment is secured on the carrier plate 3. With its shoulder 19 the comb segment 4 displaces the switch rod 14 in the direction of conveyance (horizontally) so that the angle levers 12 turn in the pivot points 11, the push rods 14 shift and actuate the switch 22 by means of the ram head 20 and thereby positively compellingly interrupt the control circuit of the escalator and instantaneously stop the continuous rotation of the escalator steps.

Upon lifting of the end of the carrier plate 3 (vertically) and therewith the bearings 11*a* and pivot point 11 of the angle levers 12 by pivoting of the carrier plate 3 about the pivot point 24, caused by the same circumstances as before, the legs 12*a* are held against the fixed abutments 23 and the actuation of the switch takes place as before.

I claim:

1. In a safety device for a passenger transporter system for the prevention of the wedging in of foreign bodies, with a switching element, the latter serving to stop the transporter system when actuated, the switching element to be actuated within a stationary part of the intake by means of horizontally moveable comb segments, the improvement comprising a carrier plate, means for pivotally mounting said carrier plate about a first pivot point, said comb segments are fastened to said carrier plate, the switching element comprises a switch, a push rod moveably mounted actuatably adjacent said switch, an angle lever and means for pivotally mounting said angle lever about a second pivot point, said angle lever having legs angularly disposed relative to each other with respect to said second pivot point and operatively actuating said switch via said push rod, switch rod means operatively engaging said comb segments and for pivoting said angle lever upon displacement of at least one of said comb segments, one of the legs of said angle lever being operatively connected with said push rod, spring means for biasing said push rod in a direction away from actuation of said switch and for operatively biasing said switch rod means so as to operatively engage said comb segments, said switch rod means upon displacement of said at least one comb segment for actuating said switch by the pivoting of said angle lever so as to move said push rod actuatingly against said switch whereby said switch is actuated and the passenger transporter system is stopped, and means cooperating with said angle lever upon pivotal lifting of the carrier plate by swinging said carrier plate about said first pivot point for pivoting said angle lever so as to move said push rod actuatingly against said switch, whereby said switch is actuated and the passenger transporter system is stopped.

2. The safety device for a passenger transporter system as set forth in claim 1, further comprising teflon foils arranged between the comb segments and the carrier plate.

3. The safety device for a passenger transporter system as set forth in claim 1, wherein said spring means is a compression spring.

4. The safety device for a passenger transporter system as set forth in claim 3, further comprising a plate washer adjustably mounted on said push rod, bearing means oriented between said switch and said plate washer for longitudinally slidably mounting said push rod therein, said compression spring is a helical spring having ends abutting said bearing means and said plate washer, said push rod having one free end adjacent said switch, the other end of said push rod is pivotally operatively connected to an end of said one leg of said angle lever, said angle lever is pivotally mounted at said second pivot point between said legs, said cooperating means comprises an abutment means adjacent the other of said legs.

5. The safety device for a passenger transporter system as set forth in claim 4, wherein said comb segments are formed with a set-off forming a recess, means for resiliently connecting said comb segments with the carrier plate for joint as well as relative pivotal and displaceable movement, said connecting means being disposed in said recess, said switch rod means is connected to said one leg of said angle lever and disposed adjacent an upper surface of said carrier plate and adjacent said set-off, said compression spring biases said push rod in a direction away from said switch and operatively biases said switch rod means against said set-off via said push rod and said one leg of said angle lever.

6. The safety device for a passenger transporter system as set forth in claim 5, including two of said angle levers, each of said angle levers are disposed at opposite sides of a plurality of said comb segments, said switch rod means is connected to both of said angle levers and extends laterally through all of said comb segments adjacent said set-offs of said comb segments, said push rod is connected to said one leg of only one of said angle levers, said one leg of the other of said angle levers is free.

7. The safety device for a passenger transporter system as set forth in claim 1, wherein said second pivot point is mounted on said carrier plate.

8. The safety device for a passenger transporter system as set forth in claim 1, wherein said carrier plate and said pivotally mounting means cooperatively constitute means for lifting said angle lever upon pivotal lifting of said carrier plate, said cooperating means comprises fixed abutment means for engaging the other of said legs when said lever is lifted, said abutment means for pivoting said angle lever so as to move said push rod actuatingly against said switch as said angle lever is lifted.

9. The safety device for a passenger transporter system as set forth in claim 8, wherein said lifting means includes bearing means for pivotally mounting said angle lever for pivoting about said second pivot point, said bearing means is mounted on said carrier plate.

10. In a safety device for a passenger transporter system for the prevention of the wedging in of foreign bodies, with a switching element, the latter serving to stop the transporter system when actuated, the switching element to be actuated within a stationary part of the intake by means of horizontally displaceable comb segments, the improvement comprising a carrier plate, means for pivotally mounting said carrier plate, said comb segments are operatively fastened to said carrier plate so as to be displaceable relative to said carrier plate and liftable with said carrier plate, respectively, the switching element comprises a switch, a push rod moveably mounted actuatably adjacent said switch, means for operatively actuating said switch via said push rod upon either: horizontal displacement independent of lifting or lifting independent of displacement or displacement and lifting together, of at least one of said comb segments, said actuating means including a member which is moved by said carrier plate when said carrier plate is rotated and which is moved relative to said carrier plate by said comb segments when said comb segments are horizontally displaced.

11. The device as set forth in claim 10, wherein said member comprises, an angle lever, means for pivotally mounting said angle lever, switch rod means operatively engaging said comb segments for pivoting said angle lever upon the horizontal displacement of said at least one of said comb segments, one of the legs of said angle lever being operatively connected with said push rod, spring means for biasing said push rod in a direction away from actuation of said switch and for operatively biasing said switch rod means so as to operatively engage said comb segments, said switch rod means upon the horizontal displacement of said at least one of said comb segments for actuating said switch by the pivoting of said angle lever so as to move said push rod actuatingly against said switch whereby said switch is actuated and the passenger transporter system is stopped, and means cooperating with said angle lever upon the lifting of said at least one of said comb segments for pivoting said angle lever so as to move said push rod actuatingly against said switch, whereby said switch is actuated and the passenger transporter system is stopped.

12. A safety device for a passenger transporter system for prevention of the wedging-in of foreign bodies between comb segments and a transporter means, comprising a carrier plate, means for pivotally mounting said carrier plate, switch means for turning off the transporter system when said switch means is actuated, said comb segments are horizontally displaceably attached to said carrier plate, means for operatively actuating said switch means when foreign bodies wedge in between said comb segments and said transporter means to cause rotatable movement of said carrier plate and/or horizontal displacement of said comb segments relative to said carrier plate, said actuating means including a member which is moved by said carrier plate when said carrier plate is rotated and which is moved relative to said carrier plate by said comb segments when said comb segments are horizontally displaced.

13. The device as set forth in claim 12, wherein said member is a rotatably mounted angle lever.

14. The device as set forth in claim 13, wherein said angle lever is rotatably mounted about a pivot point, said angle lever has two legs defining an intersection thereof, said pivot point is located at said intersection of said legs.

15. The device as set forth in claim 14, wherein said pivot point of said angle lever is rigidly connected to said carrier plate.

16. The device as set forth in claim 15, further comprising a fixed abutment adjacent one of said legs of said angle lever, said one leg strikes against said abutment upon the rotatable movement of said carrier plate so as to pivot said angle lever.

17. The device as set forth in claim 16, wherein said switch means constitutes an electrical switch having a mechanical switch contact, a push rod moveably mounted actuatably adjacent said mechanical switch contact, the other leg of said angle lever is connected to said push rod and thereby operatively connected to said mechanical switch contact.

18. The device as set forth in claim 17, wherein one end of said push rod is connected to said other leg of said angle lever, the passenger transporter system defines a servicing area, said electrical switch is disposed in said servicing area adjacent the other end of said push rod and via the latter and said angle lever is in positive operative connection with said carrier plate.

19. The device as set forth in claim 18, further comprising a spring means for biasing said push rod in a non-actuation direction away from said mechanical switch contact.

20. The device as set forth in claim 19, wherein said spring means is a compression spring.

21. The device as set forth in claim 20, wherein said compression spring is mounted axially parallel to and surrounds said push rod.

22. The device as set forth in claim 14, further comprising switch rod means rigidly connected with said angle lever for pivotally moving said angle lever by a displacement of said comb segments in a direction of movement of the passenger transporter system.

23. The device as set forth in claim 12, further comprising a teflon foil disposed between said comb segments and said carrier plate, said comb segments and said carrier plate constitute elements, said teflon foil is fastened to one of said elements.

24. The device as set forth in claim 23, further comprising spring means for adjusting moveability of said comb segments on said carrier plate.

25. The device as set forth in claim 12, wherein said switch means is a single electrical switch.

* * * * *